(No Model.) 2 Sheets—Sheet 1.

H. H. WHITACRE & A. C. WOLFE.
ELECTRIC METAL SEPARATOR.

No. 564,858. Patented July 28, 1896.

Witnesses
Fred E. Tasker
B. C. Tiffany

Inventors
H. H. Whitacre
A. C. Wolfe
by Buelow B. Brock
Attorney

THE NORRIS PETERS CO., PHOTO-LITHO., WASHINGTON, D. C.

(No Model.) 2 Sheets—Sheet 2.

H. H. WHITACRE & A. C. WOLFE.
ELECTRIC METAL SEPARATOR.

No. 564,858. Patented July 28, 1896.

Witnesses
Fred B. Tasker
B. C. Tiffany

Inventors
H. H. Whitacre
A. C. Wolfe
by Fenelon B. Brock
Attorney

THE NORRIS PETERS CO., PHOTO-LITHO., WASHINGTON, D. C.

UNITED STATES PATENT OFFICE.

HARVEY HILLARD WHITACRE AND ANDREW CURTIN WOLFE, OF WELLSVILLE, OHIO.

ELECTRIC METAL-SEPARATOR.

SPECIFICATION forming part of Letters Patent No. 564,858, dated July 28, 1896.

Application filed November 8, 1895. Serial No. 568,326. (No model.)

*To all whom it may concern:*

Be it known that we, HARVEY HILLARD WHITACRE and ANDREW CURTIN WOLFE, citizens of the United States, residing at Wellsville, in the county of Columbiana and State of Ohio, have invented certain new and useful Improvements in Electric Metal-Separators, (Case B;) and we do declare the following to be a full, clear, and exact description of the invention, such as will enable others skilled in the art to which it appertains to make and use the same, reference being had to the letters of reference marked on the accompanying drawings, which form a part of this specification.

Figure 1:
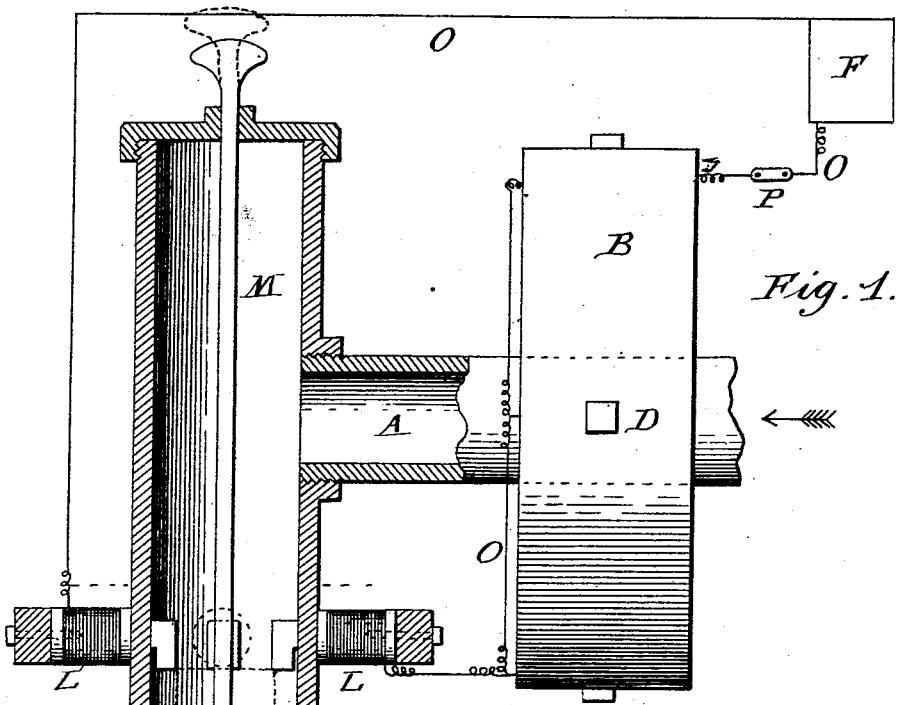
Figure 2:
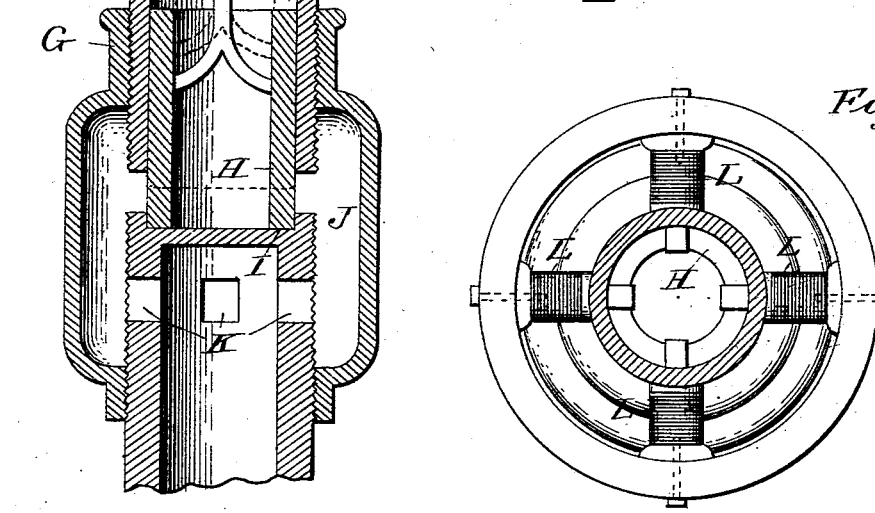
Figure 3:
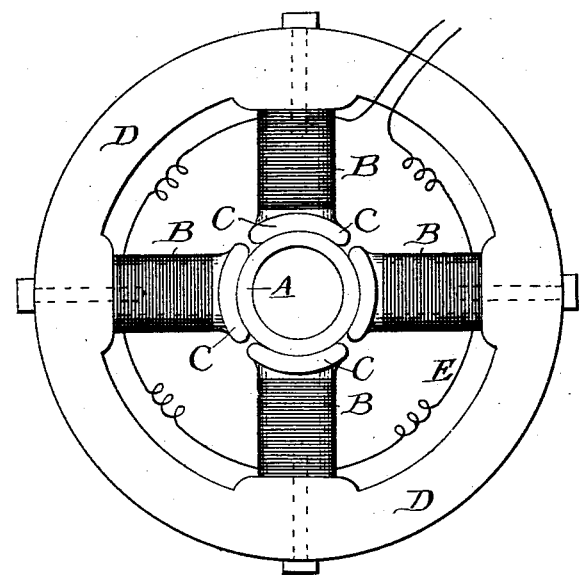
Figure 4:
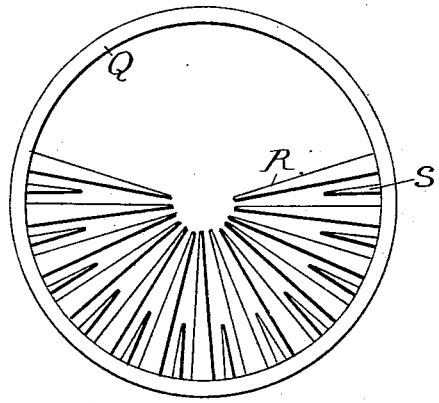

Figure 1 is a partial elevation and partial section of an electric separator device embodying our invention. Fig. 2 is a transverse horizontal section through the pipe immediately above the valve-operating magnets. Fig. 3 is a side elevation of the multipolar electric separator to which our improvements have been applied. Fig. 4 is a detail view of a modified form of the pipe through which the metal particles are arrested and separated.

The object of our invention is to thoroughly eliminate and separate all iron and steel particles which may enter into any fluid, fluid solution, or dry material, such as in pottery-clays, &c., that contain metal particles which interfere in the process of molding.

For these purposes our invention consists in the following construction and combination of parts, which will first be fully described in detail and the novel features then particularly specified.

A is a pipe through which the solution is caused to pass containing the metal particles to be eliminated.

B is a multipolar form of magnet surrounding this pipe. There may be any number of these multipolar-magnets connected in series, if desired. The poles C of the magnets B are concave to conform to the exterior of the pipe A, which is preferably of brass or other diamagnetic metal.

D is a ring uniting and supporting the series of magnets B, which are connected in series by wires E with a source of electrical energy F, as a dynamo or battery.

G is a valve apparatus which may be used either for controlling the entrance to or the discharge from the electric metal-separators.

H is a valve, and I the valve-seat. Valve H is a sliding valve, and consists of a sleeve open at both ends. A suitable by-pass J and ports K are provided for the passage of the fluid or solution.

L is a series of magnets radially disposed at one end of the valve-casing and having their poles projecting through said casing, as shown in Fig. 1. When these magnets L are excited, the iron valve H is attracted thereto, causing the valve to leave its seat and slide into contact with the magnet L, the valve H being virtually a magnet-armature.

M is a valve-stem also secured to the valve and extending outwardly through the end of the valve-casing, so that the valve may be operated either mechanically or manually, whenever it should be desired to do so, or in the event of the magnets L getting out of order.

O are the wire connections leading from the source of electrical energy F through the magnets L in series and through the multipolar electric separator-magnets in series back to the source of electrical energy.

P is a switch in said circuit, by means of which it may be opened or closed.

It will be noticed that upon the closing of the switch P the electric separator-magnets and the valve-operating magnets are simultaneously energized and the valve H opened to permit the passage therethrough of the solution containing the metallic particles.

It will be understood that, if desired, a visual or audible signal may be used with this apparatus to indicate the stoppage or unsatisfactory working of the device in the event such stoppage should occur.

Either the pipe A or the multipolar-magnets B may be caused to revolve, if desired.

In Fig. 4 the interiorly-projecting fingers R and S are shown only partially filling the tube Q.

Fingers R and S are of paramagnetic metal, such as iron, and constitute, in effect, (when the tube Q is surrounded by the poles of the separator-magnets,) multiform prolongations of the polar extremities of the magnets.

The fingers R and S converge toward the center of the tube Q, as illustrated, the fingers R extending a sufficient distance to form a cylindrical opening coaxial with the tube, and the fingers S alternating with the fingers R and being comparatively short. By this peculiar arrangement of multiform polar extremities the passage of the solution is obstructed and the magnetic fields arranged in a manner best calculated to facilitate the separation of the metallic particles. The central passage defined by the extremities of the fingers R, while permitting a strong current of the solution to pass through, is by reason of the proximity of the multitude of polar points not sufficient to permit of the escape of particles which it is desired to retard by magnetic action, and the apparatus so constructed is therefore capable of the separation of the maximum quantity of solution to be treated.

It is obvious that the removal of the concentrates from the pipe may be accomplished in a variety of ways, as, for instance, a stream of clean water may be projected through the pipe while the magnets are demagnetized, the concentrates being caught by a suitable screen or sieve.

We file of even date herewith cases relating to similar subject-matter, marked A and C, Serial Nos. 568,325 and 568,327.

What we claim as new, and desire to secure by Letters Patent, is—

1. The combination with a pipe or conduit, of a series of magnets radiating therefrom, a supporting-ring for said magnets, and converging fingers projecting toward the center of the pipe, but terminating a sufficient distance therefrom to permit of an unobstructed channel therethrough whereby a considerable obstruction is presented to the material treated, but whereby an unobstructed passage is left at the point where the magnetic attraction is strongest for a strong current of said material.

2. The combination with a conducting-pipe, a series of magnets radiating from the exterior thereof, and a supporting-ring for said magnets, of two series of converging fingers of different lengths, respectively, within the pipe, the fingers of each series being arranged alternately and constituting multiform polar extremities of the magnets.

3. The combination with a pipe, of magnets carried by said pipe, a valve sliding in the said pipe and constituting an armature within the field of the magnets whereby the valve will be operated when the magnets are magnetized, and a stem projecting outside of the pipe and operatively connected with the valve for manually actuating the same.

4. The combination of a pipe, a valve sliding in said pipe and having a stem which projects without the casing for manually operating the same, and magnets upon said pipe having pole-pieces projecting within the same and adapted to electrically operate the valve.

In testimony whereof we affix our signatures in the presence of two witnesses.

HARVEY HILLARD WHITACRE.
ANDREW CURTIN WOLFE.

Witnesses:
WILLIS JORDAN,
NELLIE J. WELLS.